Figure 1:
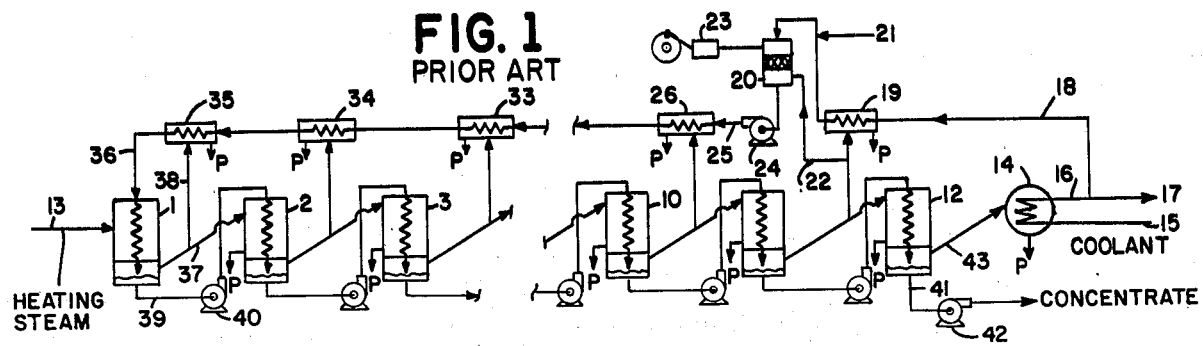
Figure 2:
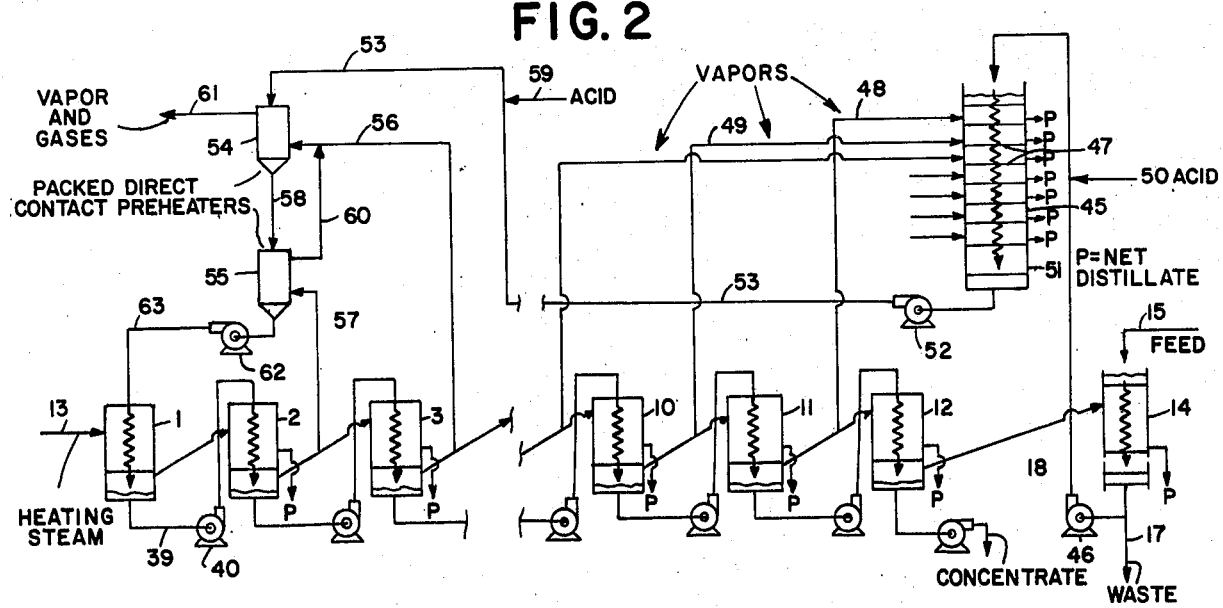
Figure 3:
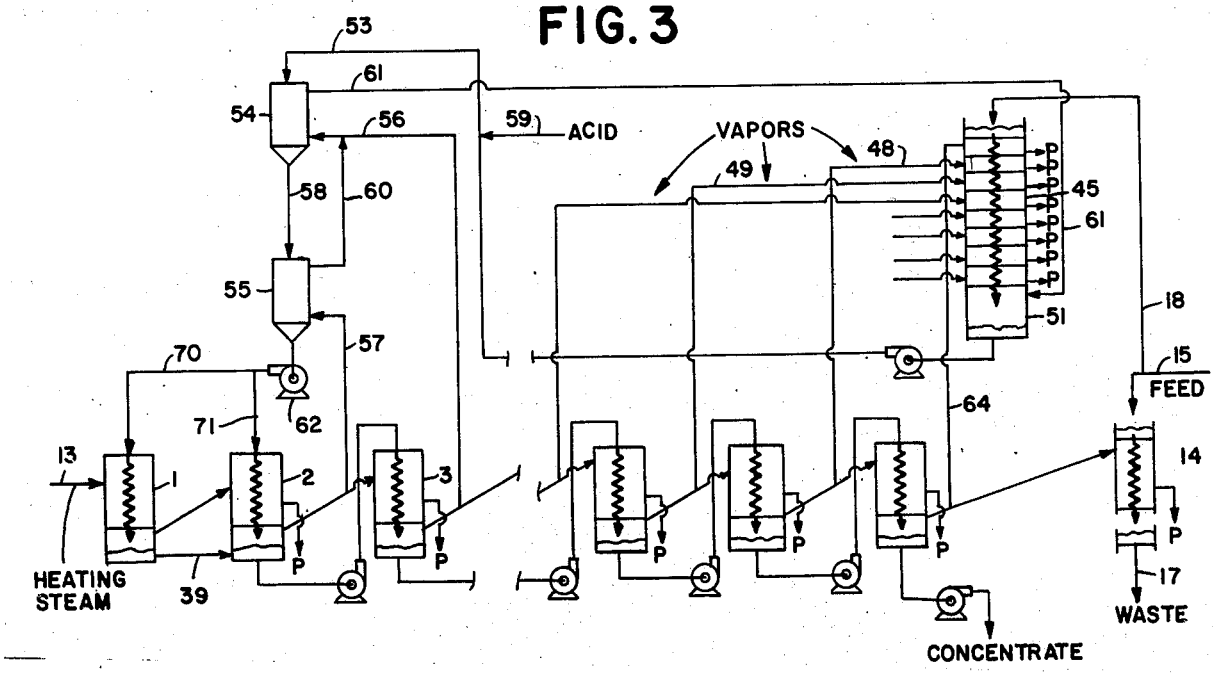

United States Patent [19]

Standiford

[11] 3,968,002
[45] July 6, 1976

[54] FEED HEATING METHOD FOR MULTIPLE EFFECT EVAPORATORS

[76] Inventor: Ferris C. Standiford, 2713 S. North Bluff Road, Greenbank, Wash. 98253

[22] Filed: Mar. 7, 1975

[21] Appl. No.: 556,472

[52] U.S. Cl. ............................ 159/13 A; 159/17 R; 159/46; 202/174
[51] Int. Cl.² ...................... B01D 1/14; B01D 1/22; B01D 1/26; B01D 1/00
[58] Field of Search ........... 159/2 MS, 13 A, 17 VS, 159/18, 46, DIG. 8; 202/174; 203/10, 11

[56] References Cited
UNITED STATES PATENTS

| | | | |
|---|---|---|---|
| 3,119,752 | 1/1964 | Checkovich | 159/2 MS |
| 3,303,106 | 2/1967 | Standiford | 159/17 VS |
| 3,494,836 | 2/1970 | Standiford | 159/2 MS |
| 3,702,807 | 11/1972 | Newson et al. | 159/18 |
| 3,830,704 | 8/1974 | Frank | 159/46 |
| 3,832,289 | 8/1974 | Kays et al. | 159/13 A |

FOREIGN PATENTS OR APPLICATIONS

| | | | |
|---|---|---|---|
| 287,763 | 8/1931 | Italy | 159/17 R |

*Primary Examiner*—Jack Sofer
*Attorney, Agent, or Firm*—Sidney W. Russell

[57] ABSTRACT

A multiple effect evaporator in which the feed is progressively preheated in an indirect falling film preheater by vapors from the lower temperature effects and then further preheated by direct contact with vapors from higher temperature effects, said preheated feed being degassed during said direct contact preheating, prior to evaporation.

4 Claims, 3 Drawing Figures

U.S. Patent   July 6, 1976   3,968,002

FEED HEATING METHOD FOR MULTIPLE EFFECT EVAPORATORS

This invention deals with improvements in the feed heating circuits of multiple effect evaporators. More specifically, it involves improved heating means for forward feed evaporators working with a cool feed solution, such as encountered in the desalting of sea water or brackish water.

One objective of the invention is to make the entire evaporator system more reliable by eliminating tube leakage as a cause of evaporator shutdowns.

Another objective is to simplify the evaporator, thereby making it less expensive in first cost and also easier to operate.

Another objective is to make unnecessary the use of separate deaerators and/or decarbonators in the feed heating circuits of such evaporators.

Another objective is to make it possible to use enhanced heat transfer surfaces to accomplish more, or all, of the indirect heat transfer in such evaporator-feed heater combinations.

A forward feed evaporator is one in which the unconcentrated feed is introduced into the first, or highest temperature, effect. Part of the water content is evaporated here, with the resulting vapor being used to heat the second effect and the partially concentrated liquid from the first effect also being passed to the second effect where more of its water content is evaporated, at a somewhat lower temperature. This procedure is repeated through the following effects of the evaporator, with the fully concentrated solution being discharged from the last effect, boiling at the lowest temperature. Sometimes, only a portion of the entire number of effects in the evaporator is operated forward feed — it will be seen that my invention is equally applicable to at least the forward-feed portion of such an evaporator.

When a feed liquid at low temperature is to be concentrated in a forward feed evaporator, it is not desirable to introduce the cool feed directly into the first effect. If this were done, much of the heating steam used by the first effect would be consumed in preheating the feed, thereby reducing the amount of heat that could be reused in subsequent effects. To remedy this situation, it is common practice to preheat the feed before it is introduced into the first effect. This preheating is usually done regeneratively in stages, with the preheaters being supplied with vapor from the lower temperature effects of the evaporator. Such feed heater arrangements are now a fairly well standardized feature of multiple effect sea water evaporators and my invention can best be illustrated by its use in such evaporators.

FIG. I is a partial diagram showing the types of equipment and the flow sequence most commonly used in present multiple effect sea water evaporators.

FIG. II is a diagram showing a revised flow sequence according to my invention.

FIG. III is a diagram showing three changes from FIG. II that are still within the scope of my invention.

In FIG. I, the forward feed evaporator has typically about 12 effects, numbered 1 through 12 in order of decreasing temperature (effects 4 through 9 are omitted from the diagram since they duplicate in function the effects shown). The first effect 1 is heated by steam from an outside source by line 13 and the vapor from the last effect 12 is condensed by sea water in condenser 14, cooled by sea water from line 15. Most of the warmed sea water from condenser 14, leaving by line 16, is discarded back to the sea or a cooling tower by line 17. The portion of this warmed sea water which is needed as feed to the evaporator is passed by line 18 through one or more preheaters 19 to decarbonator-deaerator 20. Just before entering the decarbonator-deaerator, the sea water has added to it a stream of acid, usually sulfuric, from line 21, to convert the bicarbonates present to dissolved $CO_2$ gas. This gas is then stripped out of the sea water, usually by countercurrent contact with evaporator bleed vapor, as from line 22. The released $CO_2$, plus dissolved air and an appreciable amount of water vapor, is removed by vacuum system 23. This vacuum system is shown as a mechanical vacuum pump but may consist of steam jets and usually also includes one or more condensers for removing most of the water vapor content of the gas, to reduce vacuum pump load. After decarbonation and deaeration, the sea water is pumped through the remaining feed heaters, by pump 24 and line 25. There is usually one heater for each effect, numbered here 26 through 35, the missing numbers 27 through 32 corresponding to the heaters associated with the effects omitted from the diagram. Heated sea water from the highest temperature preheater 35 is then fed by line 36 to the first effect 1. The vapor formed in this effect is used to heat both the second effect 2 by line 37 and preheater 35, by line 38. The residual sea water from effect 1 is only slightly concentrated in salts and is used as feed to the second effect 2, being transferred by line 39, usually with the aid of a pump 40. The same vapor and sea water flow sequence is repeated through the remaining effects to last effect 12, the sea water concentrate eventually being removed from last effect 12 at maximum practical concentration by line 41 and pump 42, while the low temperature vapor is passed by line 43 to condenser 14. Not shown in FIG. I is the flow sequence for the vent gases and the condensate formed in the effects, in the preheaters, and in the condenser. Venting and the collection, removal, and recovery of heat from this condensate are well known to those skilled in the art and do not influence my invention.

Thus, FIGS. I through III show only that net distillate is recovered from each section in which it is produced, via the lines labelled P.

The type of evaporator most favored for this duty of desalting sea water is the falling film evaporator, as indicated schematically in FIG. I. The reasons for using this type are set forth by Standiford and Bjork, "Chem. Eng. Progress" 63, No. 1 70–79 (1967). One reason for favoring this type is that pressures on the heating side of each effect are at all points higher than pressures on the brine side. Thus if a leak develops as a result, for example, of corrosion, the only leakage that can occur is a small amount of vapor into the brine, which has practically no effect on performance. Completely avoided is the serious leakage problem of other sea water evaporator types such as the multistage flash system, which is the leakage of brine into the distillate with consequent product contamination. However, all such multiple effect sea water evaporators built to date have used conventional shell-and-tube heat exchangers for preheaters 19 and 26 through 35, and also for condenser 14. In these units, the pressure on the sea water or heated side is always higher than the pressure on the heating or distillate side, so any tube leakage can cause serious distillate contamination. Since the sea water side of these exchangers is under pressure, the evaporator must be shut down and the heaters opened in order to locate and plug a leaking tube, or else expensive valving and piping are needed to isolate each heater in the event of a leak.

Another factor favoring the falling film evaporator in this service is that it can use enhanced tubes, such as the doubly fluted tube described in U.S. Pat. No. 3,244,601. These tubes have much higher heat transfer coefficients than smooth tubes, thus requiring many fewer tubes in an evaporator of given capacity and permitting a substantial reduction of overall size and cost of the evaporator. The same type of enhancement does not work with conventional shell-and-tube exchangers used for preheating and for the condenser, so these become a proportionately larger part of the heating surface in a system using doubly fluted tubes in the evaporator itself. There are ways to enhance the heat transfer performance of shell-and-tube exchangers, such as by using "roped" tubes which have spiral indentations in the tube wall. However, the deformation of the tube wall to achieve this enhancement makes them more susceptible than ever to erosive attack and hence more susceptible to leakage. This type of enhancement also increases the pressure drop in the tubes and hence the cost of power for operating the plant.

Figure II shows how my invention avoids these leakage problems. The evaporator effects are unchanged from FIG. I and are numbered the same. Condenser 14 has been changed to a falling film unit to eliminate the condenser as a possible source of serious product contamination. In this condenser, sea water at atmospheric pressure flows as a film down the tube walls in order to condense last effect vapor. The sea water pressure here is above the condensing temperature on the other side of the heating surface and thus a leak could contaminate the distillate. However, all that could leak would be that portion of the thin sea water film passing directly over the perforation. Also, since the tubes are open to the atmosphere, the tubes can be cleaned and a leaking tube can be found and plugged without having to shut down the entire evaporator. This application of a falling film condenser should be obvious to one skilled in the art and is not considered as part of my invention, it being included here primarily to show how this part of the evaporator can be eliminated as a potential source of evaporator downtime due to tube leakage.

My invention deals primarily with eliminating cleaning and leakage problems in the feed preheater train. For preheating the feed sea water almost to its atmospheric boiling point, my invention makes use of a falling film heat exchanger, which is very similar to the heating portion of the multistage flash evaporator disclosed in my U.S. Pat. No. 3,494,836. In FIG. II, herein this preheater 45 is fed with warmed condenser effluent sea water by pump 46 and line 18. The preheater is zoned on the condensing side by baffles 47 to permit maintaining the condensing spaces at successively higher absolute pressures from top to bottom and these spaces are supplied by vapor bled from each effect of the evaporator that boils at a pressure below atmospheric, as by lines 48 and 49. Thus all heat transfer duty of a number of conventional shell-and-tube preheaters is taken over by a single preheater, in which the tube length may be anything desired. "Pressure loss" in the falling film preheater is only little more than the vertical length of the tubes and this is usually much less than the pressure drop in conventional preheaters, thus saving on power costs. Further, the same type doubly fluted tubes can be used in the falling film preheater as are used in the evaporator, with the same degree of enhancement of heat transfer performance. A most important advantage of this falling film preheater is that the tubes are open to the atmosphere so that cleaning, leakage detection, and leakage correction are the same as described above for the falling film condenser 14.

Since the core of the tubes in my falling film preheater is occupied by gas at atmospheric pressure, it is neither necessary nor desirable to deaerate the sea water before feeding it to the preheater. Also, it is not necessary that the sea water be decarbonated before preheating, although this can be done if desired. Instead, all that is needed to prevent scale formation in the preheater is a slight lowering of the pH, which can be done by addition of a very small amount of acid, as by line 50 in FIG. II.

The sea water leaving the bottom of the tubes in my falling film preheater collects in sump 51 below the tubes and is transferred by pump 52 and line 53 to one or more direct contact heaters, 54 and 55 of FIG. II. In these heaters, the sea water is brought into direct contact with evaporator vapor bled from those effects boiling above atmospheric pressure, the vapor being supplied to the heaters by lines 56 and 57. These direct contact heaters may employ beds of packing to insure good contact between vapor and liquid or they may use simple baffles, as is common practice in direct contact or barometric condensers. These direct contact heaters are connected to operate regeneratively as in conventional practice, heat being absorbed by the sea water serially from effects boiling at successively higher pressures. It is usually convenient to arrange the direct contact heaters in a tower so that hydrostatic head of the liquid in the interconnecting sea water line or lines 58 is sufficient to overcome the vapor pressure difference between heaters. Since these direct contact heaters are swept countercurrently by relatively large volumes of vapor entering by lines 56 and 57, these vapor streams can also serve an important additional function of sweeping out dissolved air and $CO_2$ from the sea water. Thus the direct contact heaters can serve as efficient deaerators and also as decarbonators, decarbonation being effected by adding acid from line 59 to the sea water in line 53, before the sea water reaches the direct contact heaters. Further, since these direct contact heaters operate at pressures above atmospheric, the released gases can simple be vented to the atmosphere, without need for a large capacity vacuum pump 23 as used in FIG. I. This venting may be done either directly to the atmosphere from each heater, or serially through the heaters, as by lines 60 and 61 of FIG. II. The heated and now partially diluted feed from the highest temperature heater 55 is transferred by pump 62 and line 63 to the first effect 1 of the evaporator and from here on is handled in the same manner as in FIG. I.

The use of direct contact heaters for the high temperature feed heating duty eliminates the last remaining source of serious product contamination due to leaking tubes. One might think that this direct contact heating serves no useful purpose in heat recovery since the vapor condenses directly in the sea water and hence loses pure distillate or product that has had to be evaporated. However, detailed examination will show that these heaters indeed do aid heat recovery — the main reason being that the vapor used by the heaters has been generated by vapor that has been produced as net distillate in preceding effects of the evaporator. Further, these direct contact heaters also save on total plant heating surface requirements, since we are replacing conventional vapor-to-liquid exchangers having poor heat transfer performance with evaporative heating surface in the evaporator itself having much better heat transfer performance, especially if the latter employ enhanced tubes.

It will be noted that no preheater is shown in FIG. II as being heated by first effect vapor, as was done in FIG. I when using indirect contact heaters. The reason for eliminating this heater when using direct contact heaters is that it serves no useful heat recovery function since its vapor supply would not have been produced as a result of useful evaporation in preceding effects. The only time I would wish to use a direct contact preheater supplied by first effect vapor would be when the evaporator was heated by steam from line 13 at such a low pressure that only first effect vapor was at a pressure greater than atmospheric. In this case, I would use the direct contact heater solely as a means of deaeration and decarbonation.

FIG. III is similar to FIG. II but shows several further refinements in my invention, which can be used collectively or separately. In FIG. III, sea water feed to falling film preheater 45 is taken directly from the incoming sea water feed line 15, by line 18, rather than from the condenser effluent line 17. This requires transferring some of the heating surface from condenser 14 to preheater 45 and adding an additional shell side heating zone in preheater 45 to condense part of the last effect vapor, which is led to the preheater by line 64. The reason for this change is to eliminate pump 46 of FIG. II when the pressure of sea water in line 15 is sufficient to deliver feed to the top of falling film heater 45.

The second improvement in FIG. III is the passing of part or all of the vent gases from the direct contact heaters into the sump 51 of preheater 45, by line or lines 61. This improvement follows the teaching of my U.S. Pat. No. 3,494,836 and is done so that the heat content of the water vapor in these vents can be recovered by absorption of the vapor in the falling films in the preheater and also so that the $CO_2$ in these vents can be used as the means of lowering the pH and thereby avoiding scale formation in the preheater. Thus this method of handling direct contact heater vents eliminates need for the acid addition line 50 of FIG. II, and the associated control system that would normally be needed.

The third improvement in FIG. III involves splitting the stream of heated effluent sea water from the last direct contact heater 55 at the discharge of pump 62 and feeding about half to the first effect 1 and the remainder to second effect 2 of the evaporator, by lines 70 and 71, respectively. This change reduces the feed preheating load in the first effect, thereby leaving more of the heat in the incoming steam to accomplish useful evaporation. Thus the primary purpose of this change is to reduce the penalty in overall efficiency of heat usage incurred by the incorporation of the direct contact heaters. However, an important secondary advantage is that this change eliminates pump 40 of FIGS. II and I that normally is needed for transfer of partially concentrated sea water from the bottom of the first effect tubes to the top of the second effect tubes. Instead, the effluent from the first effect can be simply passed directly to the sump of the second effect by line 39, flow being induced by normal vapor pressure differences between effects.

It is obvious that the number of falling film heating stages and the number of direct contact heaters used in any plant will depend to a large extent on the design conditions of the evaporator itself, such as prime steam pressure, cooling water temperature, number of effects in the evaporator, and temperature distribution in the evaporator. In general, it can be said that as much of the preheating as possible should be done in the falling film preheater so as to leave as little as possible to be done by the less efficient direct contact heaters. In some cases, it may be found desirable to design the evaporator so that it has higher temperature differences across the higher temperature effects than normally considered optimum in order to have as few effects as possible operating above atmospheric pressure. Also, it should be realized that some additions may be needed to the flow diagrams of FIGS. II and III in the event that the evaporator is to be operated at other than a single production rate. This is because at part load, for instance, the temperature in the early effects decreases and some or all of the direct contact heaters may then have to be supplied by vapor at less than atmospheric pressure. In this case, it would become necessary to add a vacuum pump in line 61 of FIGS II and III, but the pump would be needed only during low load periods and would not have to be designed for a high compression ratio. Alternatively, more falling film preheater stages could be added in place of or in addition to the direct contact heaters. In this case, throttle valves would be included in the vapor lines to the lowermost falling film preheater stages or stage in order to prevent boiling of the feed in the falling film tubes when the evaporator was operating at the highest loads and vapor to the preheater stages comes from effects boiling substantially above atmospheric pressure.

In summary, by use of the teachings of this invention, one is able to build an evaporator in which tube leakage problems are practically eliminated and one in which the heating surfaces in contact with the raw feed are accessible for cleaning or for finding and plugging a leaking tube without need for a plant shutdown. These results are achieved at only a very small loss in efficiency of heat utilization and at an actual saving of total heating surface requirements. While a falling film evaporator is preferred for this service, it is obvious that the feed heater system claimed herein is equally suitable to other types of evaporator.

I claim:

1. A feed preheater system for a forward feed multiple effect falling film evaporator, said system comprising a falling film indirect preheater and a direct vapor contacting preheater, the discharge of the former feeding the latter, said system being constructed and arranged to raise the temperature of the feed to below the atmospheric boiling point thereof in the falling film preheater, said falling film preheater being heated by vapors from the lower temperature effects and the direct contact preheater by vapor from a higher temperature effect, said preheated feed entering the highest temperature effect.

2. The system as defined in claim 1 wherein the preheated feed enters at least two of the highest temperature effects as parallel feed.

3. The system as defined in claim 1 wherein acid is added to the feed before said feed enters the direct contact preheater, whereby said direct contact preheater also serves as a decarbonator.

4. The system as defined in claim 1 wherein said direct contact preheater is pluralized and they are connected in series liquid feed flow and are in turn heated by vapors at successively higher pressures from intermediate higher pressure effects of the evaporator.

* * * * *